US009330510B2

(12) United States Patent
Kawamura et al.

(10) Patent No.: US 9,330,510 B2
(45) Date of Patent: May 3, 2016

(54) ELECTRONIC KEY REGISTRATION METHOD AND ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Hiroaki Iwashita, Aichi (JP); Masaki Hayashi, Aichi (JP); Masaki Oshima, Aichi (JP); Yosuke Ohashi, Aichi (JP); Kazunori Arakawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 128 days.

(21) Appl. No.: 14/175,013

(22) Filed: Feb. 7, 2014

(65) Prior Publication Data

US 2014/0232520 A1 Aug. 21, 2014

(30) Foreign Application Priority Data

Feb. 15, 2013 (JP) ................................ 2013-027714

(51) Int. Cl.
*G05B 19/00* (2006.01)
*G07C 9/00* (2006.01)

(52) U.S. Cl.
CPC ........ *G07C 9/00007* (2013.01); *G07C 9/00309* (2013.01); *G07C 9/00817* (2013.01)

(58) Field of Classification Search
CPC .......... G07C 9/00007; G07C 9/00309; G07C 9/00817
USPC ........................................................ 340/5.23
See application file for complete search history.

(56) References Cited

FOREIGN PATENT DOCUMENTS

| | | | |
|---|---|---|---|
| JP | 07-061328 | | 3/1995 |
| JP | 2003-148018 | | 5/2003 |
| JP | 2004-107959 | | 4/2004 |
| JP | 2013234521 A | * | 11/2013 |

OTHER PUBLICATIONS

U.S. Appl. No. 14/174,318 to Daisuke Kawamura et al., filed Feb. 6, 2014.
U.S. Appl. No. 14/058,710 to Daisuke Kawamura et al., filed Oct. 21, 2013.

* cited by examiner

*Primary Examiner* — Kerri McNally
(74) *Attorney, Agent, or Firm* — Greenblum & Bernstein, P.L.C.

(57) ABSTRACT

A method for registering an electronic key to a controller of a communication subject includes locating an electronic key ID of a registered electronic key, which is registered to a first controller that was previously installed in the communication subject, based on a communication subject ID unique to the communication subject, and reregistering the registered electronic key to a second controller installed in the communication subject in lieu of the first controller by storing the electronic key ID of the registered electronic key and an encryption code corresponding to the electronic key ID in the second controller.

6 Claims, 11 Drawing Sheets

Fig. 2A Factory Registration
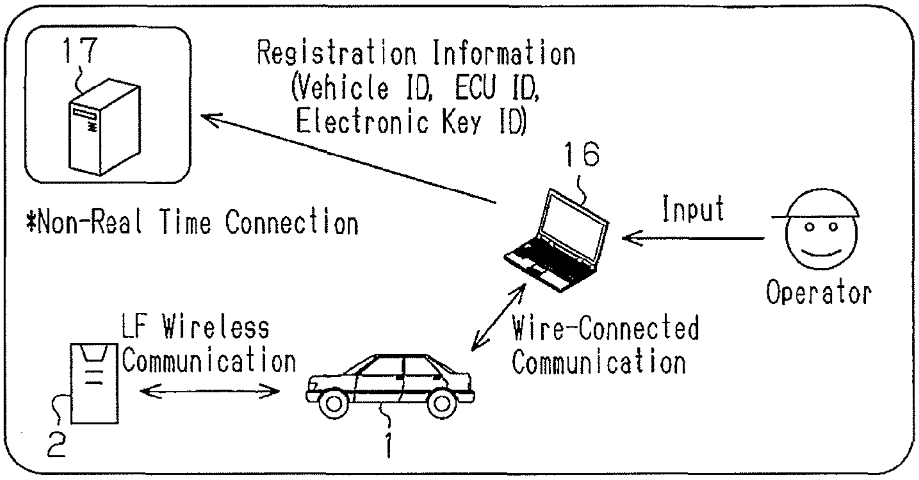
Fig. 2B Online Registration
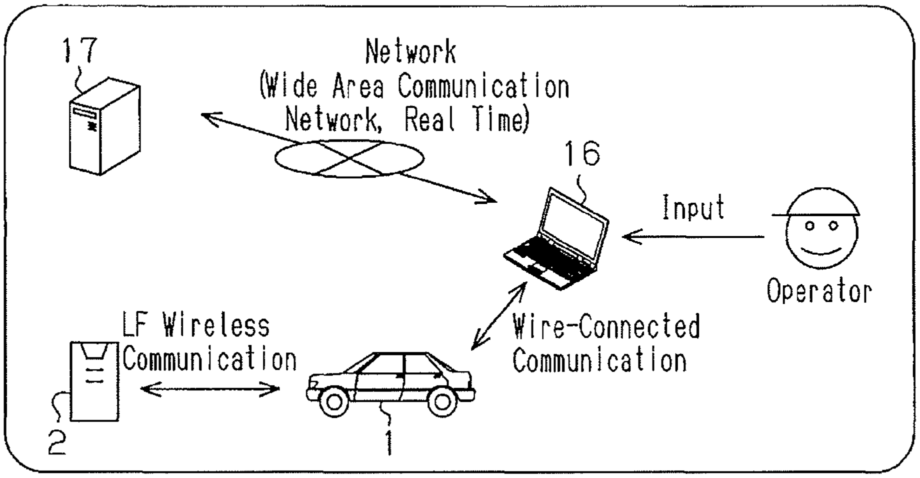
Fig. 2C Offline Registration
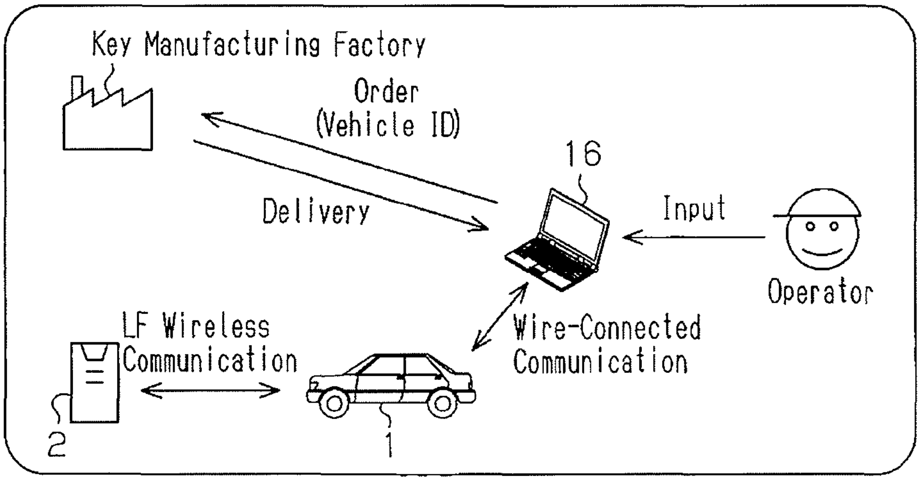

ELECTRONIC KEY REGISTRATION METHOD AND ELECTRONIC KEY REGISTRATION SYSTEM

CROSS-REFERENCE TO RELATED APPLICATIONS

This application is based upon and claims the benefit of priority from prior Japanese Patent Application No. 2013-027714, filed on Feb. 15, 2013, the entire contents of which are incorporated herein by reference.

FIELD

The present invention relates to a method and a system for registering an electronic key to a communication subject.

BACKGROUND

Vehicles often include an electronic key system that verifies an electronic key with an electronic key ID transmitted through wireless communication from the electronic key. In such an electronic key system, the electronic key needs to be registered to the vehicle. Thus, the electronic key or an encryption code is registered in advance to a controller such as an electronic control unit that manages the operation of the electronic key system in the vehicle. Japanese Laid-Open Patent Publication Nos. 7-61328, 2003-148018, and 2004-107959 each describe an example of an electronic key registration system.

SUMMARY

When the controller malfunctions, there is a need to replace the controller with a new one. In this case, it would be convenient if the electronic keys that were registered to the old controller can be continuously used with the new controller. Thus, to use the same electronic keys with the new controller, the electronic keys need to be registered again to the controller. It is desirable that the level of security be improved when reregistering such electronic keys.

One aspect of the present invention is a method for registering an electronic key to a controller of a communication subject. The electronic key includes a unique electronic key ID and an encryption code associated with the electronic key ID and used for encrypted communication between the electronic key and the controller. The method includes locating an electronic key ID of a registered electronic key, which is registered to a first controller that was previously installed in the communication subject, based on a communication subject ID unique to the communication subject. Further, the method includes reregistering the registered electronic key to a second controller, installed in the communication subject in lieu of the first controller, by storing the electronic key ID of the registered electronic key and an encryption code corresponding to the electronic key ID in the second controller.

A further aspect of the present invention is an electronic key registration system including a first controller, a second controller, an electronic key, and a management center. The first controller may be installed in a communication subject. Further, the first controller stores a first controller ID. The second controller may be installed in the communication subject in lieu of the first controller. Further, the second controller stores a second controller ID. The electronic key includes a unique electronic key ID and an encryption code associated with the electronic key ID. The encryption code is used for encrypted communication between the electronic key and the controller. The management center is capable of communicating with the first and second controllers. The first and second controllers each include a second memory and are each configured to register the electronic key by storing the electronic key ID and the encryption code in the second memory. The management center includes a database and is configured to associate a communication subject ID, which is unique to the communication subject, to the first or second controller ID and the electronic key ID in the database. The management center further includes a registration control unit that is configured to permit reregistration of the electronic key to the second controller when the second controller is installed in the communication subject in lieu of the first controller if the electronic key ID is associated with the first controller ID.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a diagram illustrating registration of an electronic key with an electronic key registration system in a plant;

FIG. 2B is a diagram illustrating online registration of an electronic key with the electronic key registration system;

FIG. 2C is a diagram illustrating offline registration of an electronic key with the electronic key registration system;

DESCRIPTION OF THE EMBODIMENTS

An electronic key registration system 15 will now be discussed with reference to the drawings. An electronic key system 3 will first be described.

[Electronic Key System]

Figure 1:
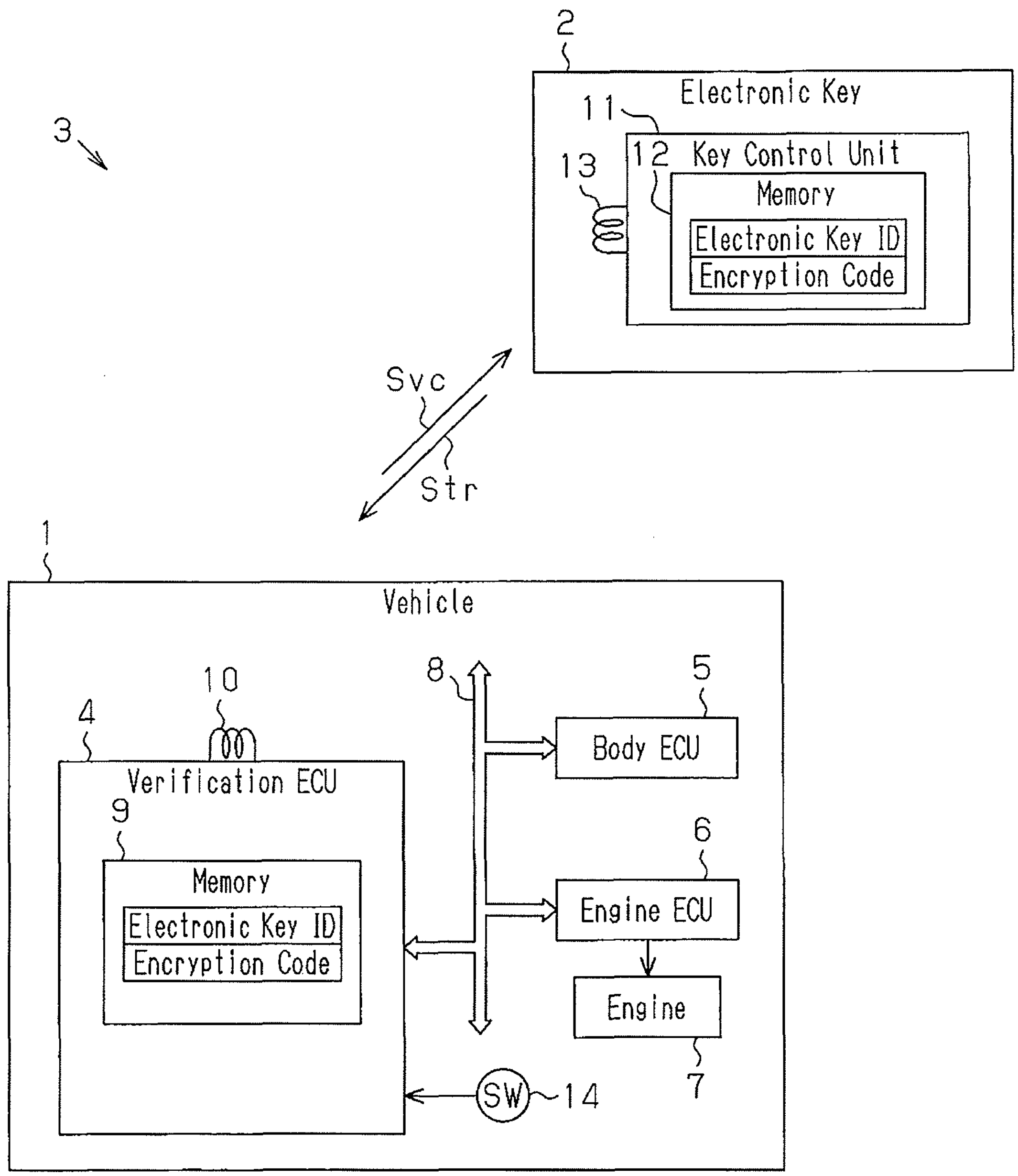
FIG. 1 is a schematic block diagram illustrating one embodiment of an electronic key system.

Referring to FIG. 1, the vehicle 1 includes the electronic key system 3 that verifies an electronic key 2 through wireless communication. The electronic key system 3 is, for example, a radio frequency identification (RFID) system. In the present embodiment, the RFID system is an immobilizer system that performs ID verification (immobilizer verification) on the electronic key 2 through bidirectional near-field wireless communication (communication distance of several centimeters to several tens of centimeters) on a frequency of, for example, approximately 13.56 MHz.

The vehicle 1 includes a verification ECU 4, which verifies the electronic key 2, a body ECU 5, which manages the power supply for electric onboard devices, and an engine ECU 6, which controls the engine 7. A bus 8 connects the ECUs 4 to 6 in the vehicle. The verification ECU 4 includes a memory 9. The memory 9 stores an ID of the electronic key 2 (electronic key ID) and an encryption code. The encryption code is used for encrypted verification performed during ID verification of the electronic key 2, that is, for encrypted communication between the verification ECU 4 and the electronic key 2. In the present embodiment, challenge-response verification is performed as the encrypted verification. The electronic key ID and the encryption code are stored in the memory 9 associated with each other as a set. The number of sets of the electronic key ID and the encryption code stored in the memory 9 conforms to the number of electronic keys registered to the vehicle 1. The verification ECU 4 is connected to a communication antenna 10 that allows for the transmission and reception of radio waves on a low frequency (LF) band. The verification ECU 4 is one example of a controller.

The electronic key 2 includes a key control unit 11 that manages the operation of the electronic key 2. The key control unit 11 includes a memory 12, which stores the electronic key ID and the encryption code. The key control unit 11 is connected to a communication antenna 13 that allows for the transmission and reception of LF radio waves.

When a driver enters the vehicle, the verification ECU 4 transmits drive radio waves Svc from the communication antenna 10. The drive radio waves Svc includes non-modulated waves, which is used as power (drive power) for the electronic key 2, and a challenge code, which is used for the challenge-response verification. The challenge code is changed whenever verification is performed. The electronic key 2 is activated by the drive radio waves Svc received by the communication antenna 13 and returns a transponder signal Str to the verification ECU 4. The transponder signal Str includes the electronic key ID, which is registered to the electronic key 2, and a response code. The response code is generated from the challenge code, which is received from the vehicle 1, and the encryption code, which is stored in the memory 12.

The verification ECU 4 also generates a response code from the encryption code stored in the memory 9 and the challenge code. Then, the verification ECU 4 obtains the response code from the transponder signal Str received by the communication antenna 10 to perform challenge-response verification by comparing the received response code with the generated response code. Further, the verification ECU 4 obtains the electronic key ID from the transponder signal Str and performs ID verification by comparing the electronic key ID with the electronic key ID stored in the memory 9. When challenge-response verification and ID verification are accomplished, the verification ECU 4 determines that immobilizer verification has been accomplished and permits power shifting operations and engine starting operations to be performed with the engine switch 14.

[Electronic Key Registration System]

FIGS. 2A to 2C illustrate the electronic key registration system 15 that registers the electronic key 2 to the vehicle 1. In the present example, the electronic key registration system 15 includes the vehicle 1 (verification ECU 4), the electronic key 2, a registration tool 16, and a management center 17. The registration process of the electronic key 2 (hereafter also referred to as key registration) is classified into factory registration serving as area-limited registration (refer to FIG. 2A), online registration (refer to FIG. 2B), and offline registration (refer to FIG. 2C). Factory registration is performed when initially registering the electronic key 2 to the vehicle 1 in a factory. Online registration is performed when registering the electronic key 2 to the vehicle 1 by accessing a network. Offline registration is performed when registering the electronic key 2 to the vehicle 1 without accessing a network.

Figure 3:
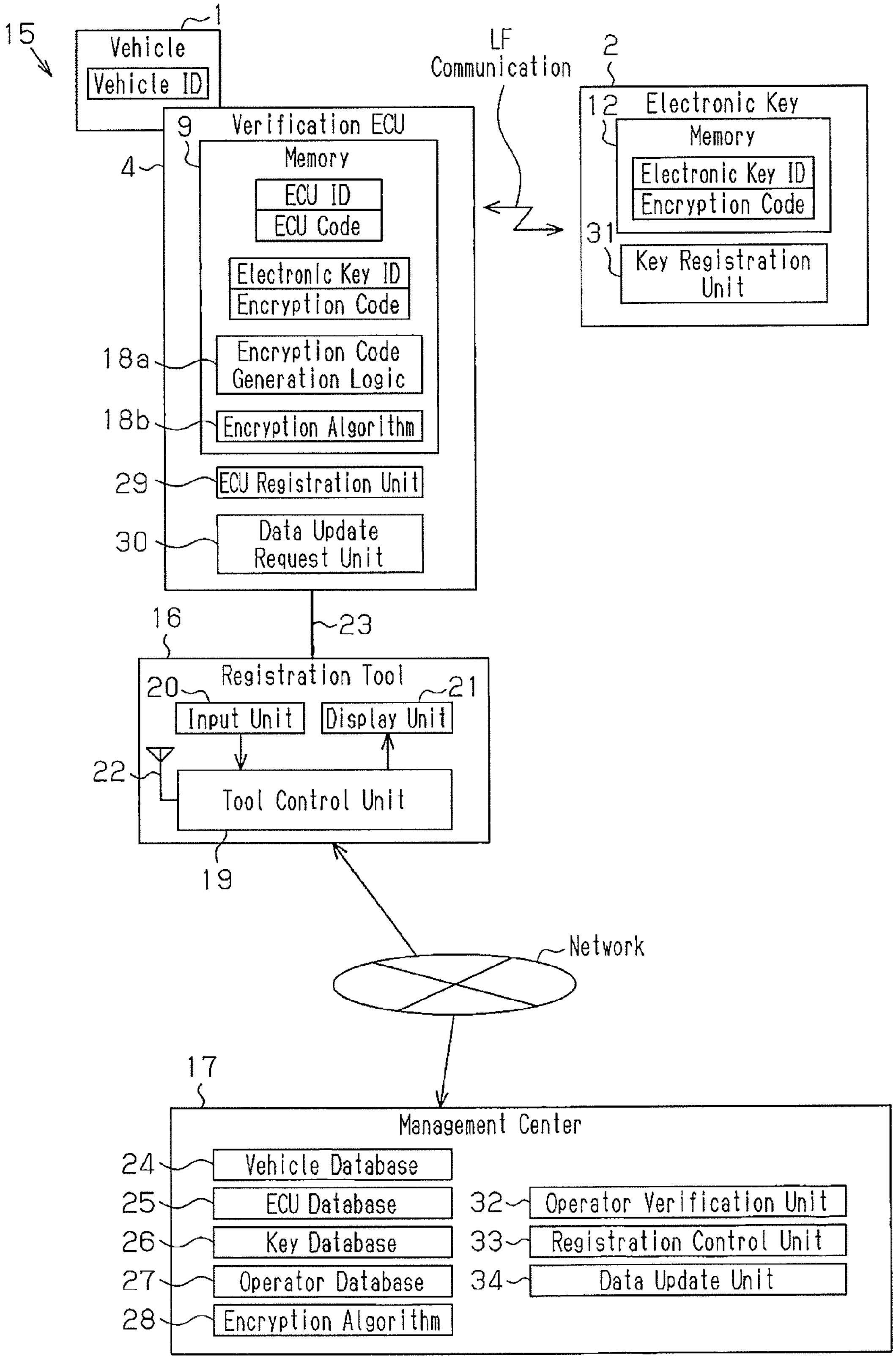
FIG. 3 is a schematic block diagram of the electronic key registration system.

As illustrated in FIG. 3, the memory 9 of the verification ECU 4 stores an ECU ID, which is unique to the verification ECU 4, and an ECU code, which associates the verification ECU 4 with the management center 17. Further, the memory 9 stores an encryption code generation logic 18*a* and an encryption algorithm 18*b*. The encryption code generation logic 18*a* is used to compute the encryption code during factory registration. The encryption algorithm 18*b* is used to compute the encryption code during online registration and offline registration. The Advanced Encryption Standard (AES), for example, is used for the encryption algorithm. The verification ECU 4 performs key registration through LF band bidirectional near-field wireless communication, which is used for immobilizer verification. The ECU ID is one example of a controller ID. The ECU code is one example of a controller code. The encryption code generation logic 18*a* is one example of an encryption code computation equation.

A vehicle ID, which is unique to the vehicle 1, is registered to the vehicle 1. The vehicle ID is, for example, an identification number that is marked on the vehicle body or the like. The vehicle ID is one example of a communication subject ID.

The registration tool 16 includes a tool control unit 19 that controls the operation of the registration tool 16, an input unit 20 such as a keyboard, a display unit 21 that displays various types of images, and a network communication antenna 22. The registration tool 16 performs wire-connected communication with the vehicle 1 through, for example, a cable 23. The registration tool 16 communicates with the management center 17 through the network communication antenna 22. The Internet, for example, is used for the network communication. The registration tool 16 is operated by an operator.

The management center 17 includes a vehicle database 24, an ECU database 25, a key database 26, and an operator database 27. Although not illustrated, the management center 17 includes a computer or processor, for example, a server, that controls the processing performed in the management center 17. The vehicle ID, the ECU ID, the electronic key ID, and the operator ID are stored in the vehicle database 24 associated with one another. The ECU ID and the ECU code are stored in the ECU database 25 associated with each other. The electronic key ID and the encryption code are stored in the key database 26 associated with each other. An operator ID, which is unique to the operator, and a password are stored in the operator database 27 associated with each other. The management center 17 also stores an encryption algorithm 28, which is the same as that stored in the verification ECU 4.

The verification ECU 4 includes an ECU registration unit 29, which controls key registration, and a data update request unit 30, which requests the management center 17 to update the data of the databases 24 to 27. The ECU registration unit 29 controls key registration in accordance with registration commands received from the registration tool 16. The data update request unit 30 transmits a data update request to the management center 17 after key registration is completed.

The electronic key 2 includes a key registration unit 31 that controls key registration. The key registration unit 31 controls the registration of the electronic key 2 to the verification ECU 4 in cooperation with the ECU registration unit 29.

The management center 17 further includes an operator verification unit 32 that verifies the operator during key registration, a registration control unit 33 that controls key registration, and a data update unit 34 that reflects a key registration result to the databases 24 to 27 after key registration is completed. The operator verification unit 32 refers to the operator database 27 to verify the operator using the operator ID input during key registration. The registration control unit 33 computes a SEED code with the encryption algorithm 28 stored in the management center 17. The SEED code is used to generate the encryption code.

The operation of the electronic key registration system 15 will now be described with reference to FIGS. 4 to 11.

(I) Factory Registration (Initial Registration)

Figure 4:
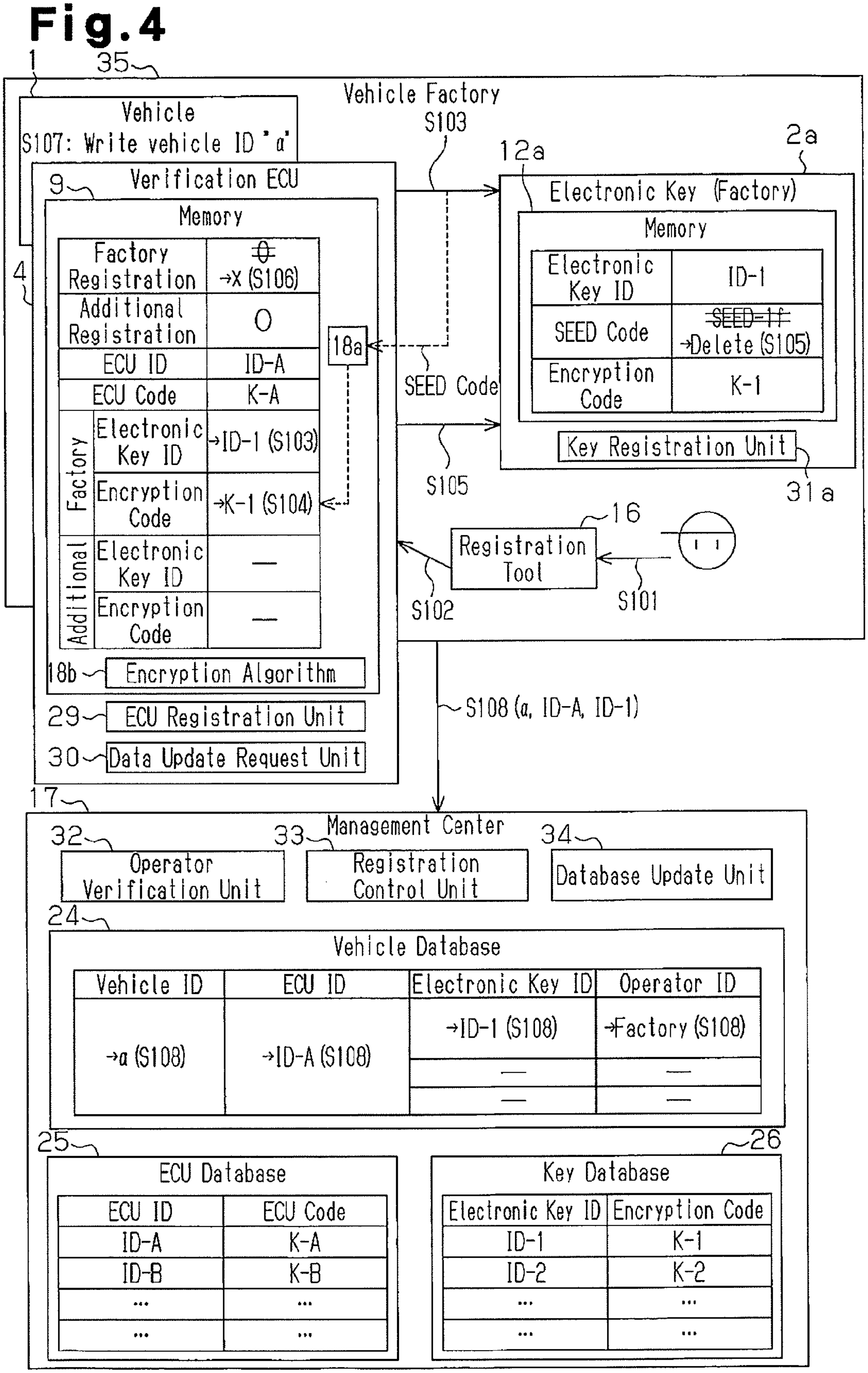
FIG. 4 is a diagram illustrating the registration of a factory-registered electronic key.

Referring to FIG. 4, an electronic key 2*a* is initially registered to the vehicle (verification ECU 4) using the registration tool 16, which is provided in, for example, a vehicle factory 35. Prior to the factory registration (initial registration), an electronic key ID "ID-1", a SEED code "SEED-1f", and an encryption code "K-1" are written beforehand to the memory 12*a* of the electronic key 2*a*.

In step S101, the operator inputs a command to the registration tool 16 to start factory registration. In step S102, in accordance with the factory registration start command, the registration tool 16 sends a factory registration command to the verification ECU 4 through wire-connected communication.

In step S103, when the ECU registration unit 29 receives the factory registration command, the ECU registration unit 29 acquires the electronic key ID "ID-1" and a SEED code "SEED-1f" from the electronic key 2*a* through LF band bidirectional near-field wireless communication. More specifically, the ECU registration unit 29 transmits a key information acquisition request to the electronic key 2*a*. When the key registration unit 31*a* receives the key information acquisition request from the verification ECU 4, the key registration unit 31*a* reads the electronic key ID "ID-1" and the SEED code "SEED-1f" from the memory 12*a* and transmits the electronic key ID "ID-1" and the SEED code "SEED-1f" to the vehicle 1. The ECU registration unit 29 writes the electronic key ID "ID-1", acquired from the electronic key 2*a*, to a factory-registered electronic key ID storage region of the memory 9.

In step S104, the ECU registration unit 29 writes the encryption code associated with the electronic key ID "ID-1" to the memory 9. More specifically, the ECU registration unit 29 uses the encryption code generation logic 18*a* to compute the encryption code "K-1" from the SEED code "SEED-1f" acquired from the electronic key 2*a*. Then, the ECU registration unit 29 writes the encryption code "K-1" to a factory-registered encryption code storage region of the memory 9.

In step S105, the ECU registration unit 29 transmits a SEED code delete request to the electronic key 2*a* through LF band bidirectional near-field wireless communication. When the key registration unit 31*a* receives the SEED code delete request from the verification ECU 4, the key registration unit 31*a* deletes the SEED code "SEED-1f" from the SEED code storage region of the memory 12*a*.

Optionally, in step S106, when the ECU registration unit 29 receives a request for deleting a factory registering function from the registration tool 16, the ECU registration unit 29 may switch a factory registration flag from "acceptable (marked by circle in FIG. 4)" to "rejected (marked by cross in FIG. 4)". When the factory registration flag is set to "rejected", the factory registration function is invalidated. In this case, the encryption code generation logic 18*a* is also deleted from the verification ECU 4. As a result, factory registration is subsequently disabled.

In step S107, the operator registers, for example, a vehicle ID "α" to the vehicle 1. The vehicle ID "α" is marked on the vehicle body or the like of the vehicle 1.

In step S108, the data update request unit 30 transmits registration information to the management center 17 through the registration tool 16 to request the management center 17 to update the data of the vehicle database 24. The registration information includes, for example, the vehicle ID "α", the ECU ID "ID-A", the electronic key ID "ID-1", the operator ID (here, factory ID indicating that factory registration is performed), and the data update request command. In this case, the registration tool 16 does not have to automatically transmit the registration information to the management center 17. For example, the operator may transmit the registration information to the management center 17. Further, the registration information does not have to be transmitted to the management center 17 immediately after registration is completed and may be transmitted when a predetermined time (period) elapses after the registration is completed.

The data update unit 34 writes the vehicle ID "α", the ECU ID "ID-A", the electronic key ID "ID-1", and the operator ID "factory" (factory registration) to the vehicle database 24 in association with the registration information acquired from the registration tool 16.

Steps S101 to S108 (step S106 may be excluded) are repeated whenever an electronic key 2*a* is registered to the vehicle 1 (verification ECU 4) in the vehicle factory 35. Accordingly, when registering a plurality of electronic keys 2*a* to the same vehicle (e.g., vehicle ID "α"), a new set of an electronic key ID and task information is associated with the same set of the vehicle ID and the ECU ID stored in the vehicle database 24. Further, when registering an electronic key 2*a* to another vehicle (e.g., vehicle ID "β"), a set of the vehicle ID, the ECU ID, the electronic key ID, and the task information is added to the vehicle database 24.

(II) Online Registration (Online Additional Registration in Market)

Figure 5:
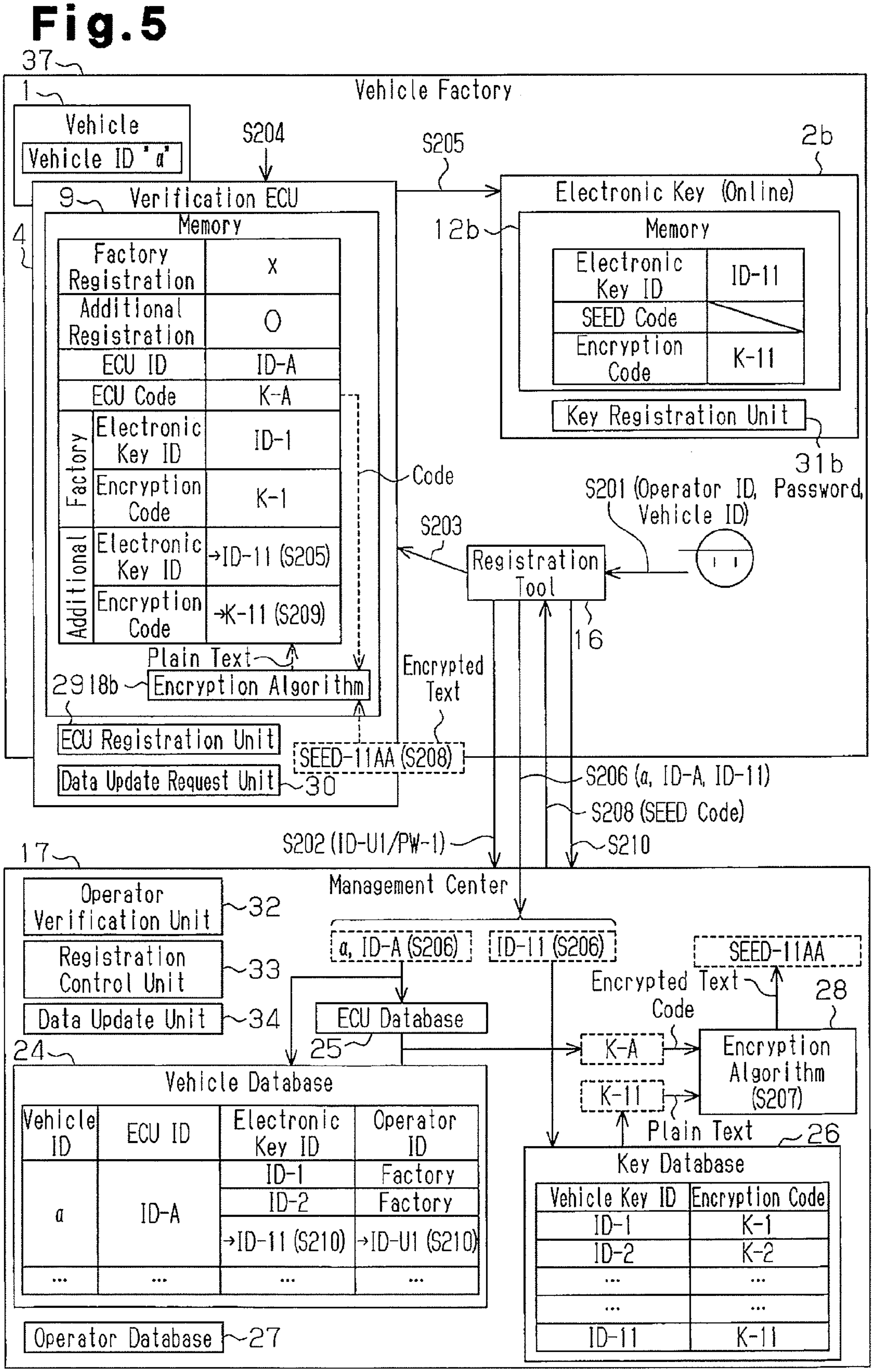
FIG. 5 is a diagram illustrating the registration of an online-registered electronic key.

Referring to FIG. 5, when network communication is available, an electronic key 2*b* may be additionally registered online to the vehicle 1 (verification ECU 4) using the registration tool 16, which is provided in, for example, a vehicle dealer 37. Prior to the online registration, an electronic key ID "ID-1" and an encryption code "K-1" are written beforehand to the memory 12*a* of the electronic key 2*b*. The SEED code "SEED-1f" does not have to be written to the memory 12*b*.

In step S201, the operator inputs a command to the registration tool 16 to start additional registration. In this case, the operator inputs an operator ID "ID-U1", a password "PW-1", and the vehicle ID "α", which is marked on the vehicle body, to the registration tool 16.

In step S202, the registration tool 16 transmits the operator ID "ID-U1" and the password "PW-1" to the management center 17 through network communication. The operator verification unit 32 verifies the operator when the operator ID "ID-U1" and the password "PW-1" acquired from the registration tool 16 are associated with each other in the operator database 27. Then, when the operator verification unit 32 verifies the operator, the operator verification unit 32 transmits an operator verification accomplishment notification to the registration tool 16 by performing network communication.

In step S203, the registration tool 16 transmits an additional registration command to the verification ECU 4 by performing wire-connected communication in response to the operator verification accomplishment notification.

In step S204, the registration tool 16 instructs the ECU registration unit 29 to read registered electronic key IDs. In response, the ECU registration unit 29 checks whether or not a registered electronic key ID (here, electronic key ID "ID-1") is stored in the memory 9. When there is no registered electronic key ID, the additional registration process is forcibly terminated.

When there is a registered electronic key ID, in step S205, the ECU registration unit 29 reads the electronic key ID from the electronic key 2*b* through LF bidirectional near-field wireless communication. More specifically, the ECU registration unit 29 transmits a key information acquisition request to the electronic key 2*b*. When the key registration unit 31*b* receives the key information acquisition request from the verification ECU 4, the key registration unit 31*b* reads the electronic key ID "ID-11" from the memory 12*b* and transmits the electronic key ID "ID-11" to the vehicle 1. The ECU registration unit 29 writes the electronic key ID "ID-11", which is acquired from the electronic key 2*b*, to an additional registration electronic key ID storage region of the memory 9.

In step S206, the ECU registration unit 29 transmits the electronic key ID "ID-11", together with the ECU ID "ID-A" and the vehicle ID "α", which is input to the registration tool 16 in step S201, from the registration tool 16 to the management center 17 through network communication.

Based on the vehicle ID "α" and the ECU-ID "ID-A", the registration control unit 33 refers to the vehicle database 24 and the ECU database 25 to read the ECU code used for additional registration of the electronic key 2*b*, that is, the ECU code "K-A" associated with the ECU-ID "ID-A". Further, based on the electronic key ID "ID-11", the registration control unit 33 refers to the key database 26 to read the encryption code used for additional registration of the electronic key 2*b*, that is, the encryption code "K-11" associated with the electronic key ID "ID-11".

In step S207, the registration control unit 33 generates a SEED code "SEED-11AA" based on the ECU code "K-A", the encryption code "K-11", and the encryption algorithm 28. In this case, the registration control unit 33 inserts the ECU code "K-A" as an encryption code and the encryption code "K-11" as a plain text in the encryption algorithm 28 to compute the SEED code "SEED-11AA" as an encrypted text dedicated for the ECU ID "ID-A".

In step S208, the registration control unit 33 transmits the SEED code "SEED-11AA" to the registration tool 16 through network communication. The SEED code "SEED-11AA" is transmitted from the registration tool 16 to the verification ECU 4.

In step S209, the ECU registration unit 29 generates the encryption code "K-11" related to the electronic key ID "ID-11" based on the ECU code "K-A", which has already been stored in the memory 9, the SEED code "SEED-11AA", and the encryption algorithm 18*b*. Then, the ECU registration unit 29 writes the encryption code "K-11" to the memory 9. In this case, the ECU registration unit 29 inserts the ECU code "K-A" as an encryption code and the SEED code "SEED-11AA" as an encrypted text in the encryption algorithm 18*b* to compute the encryption code "K-11" as a plain text. The encryption code "K-11" is written to the additional registration encryption code storage region of the memory 9.

In step S210, the ECU registration unit 29 transmits a registration completion notification from the registration tool 16 to the management center 17 by performing network communication. When the management center 17 receives the registration completion notification, the management center determines that the encryption code "K-11" has been correctly registered to the verification ECU 4.

Further, in step S210, the data update request unit 30 transmits a data update request from the registration tool 16 to the management center 17 through network communication. The data update unit 34 updates the vehicle database 24 in response to the data update request. In this case, the operator ID "ID-U1", which is acquired in step S202, and the electronic key ID "ID-11", which is acquired in step S206, are written to the vehicle database 24 in association with the vehicle ID "α" and the ECU ID "ID-A".

Steps S201 to S210 are repeated whenever the vehicle dealer 37 registers an online-registered electronic key 2*b* to the vehicle 1 (verification ECU 4). Accordingly, when registering a plurality of electronic keys 2*b* to the same vehicle, a new set of an electronic key ID and an operator ID is associated with the same set of the vehicle ID and the ECU ID stored in the vehicle database 24.

(III) Offline Registration (Offline Additional Registration in Market)

Figure 6:
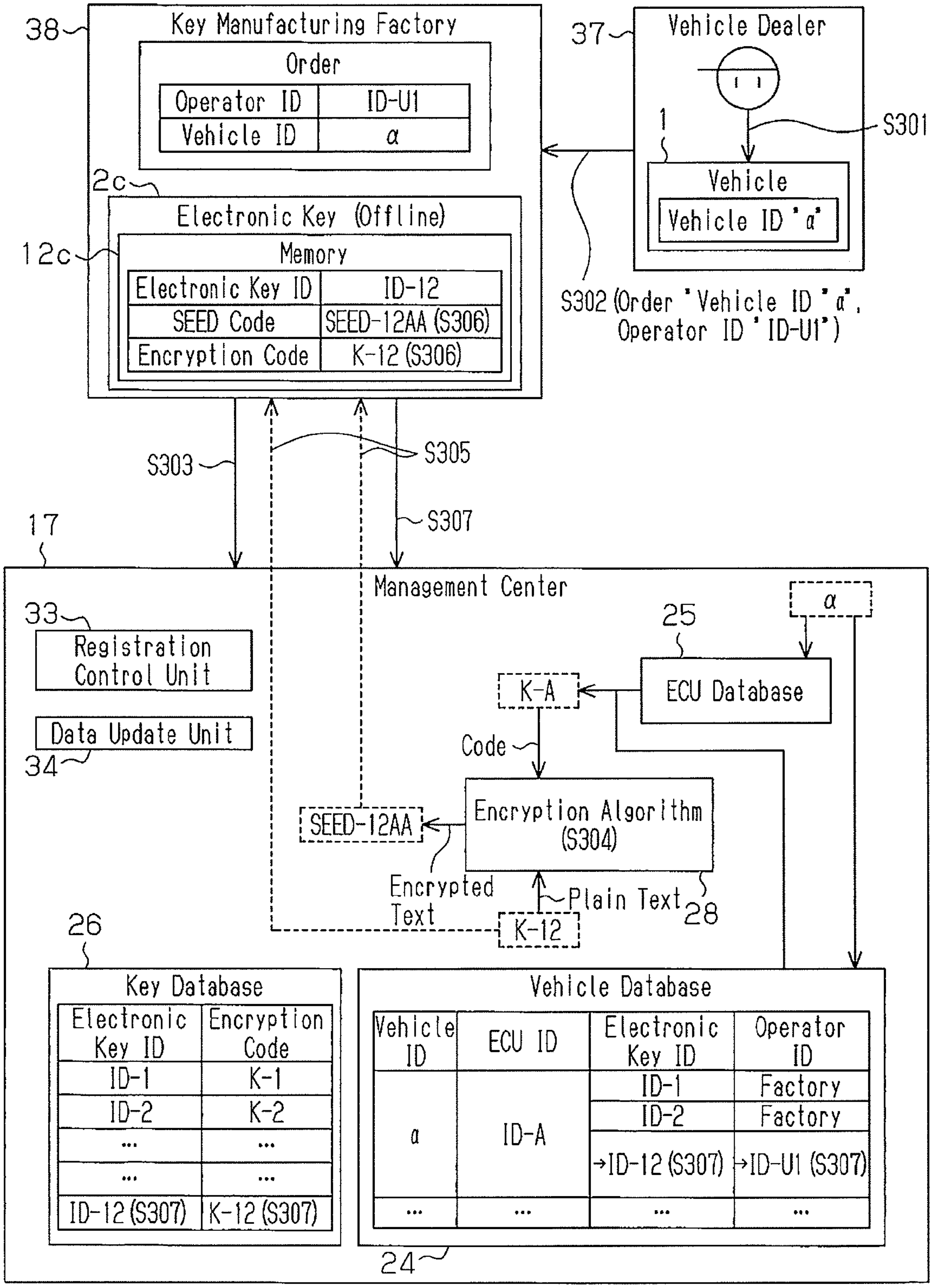
FIG. 6 is a diagram illustrating the manufacturing of an offline-registered electronic key.
Figure 7:
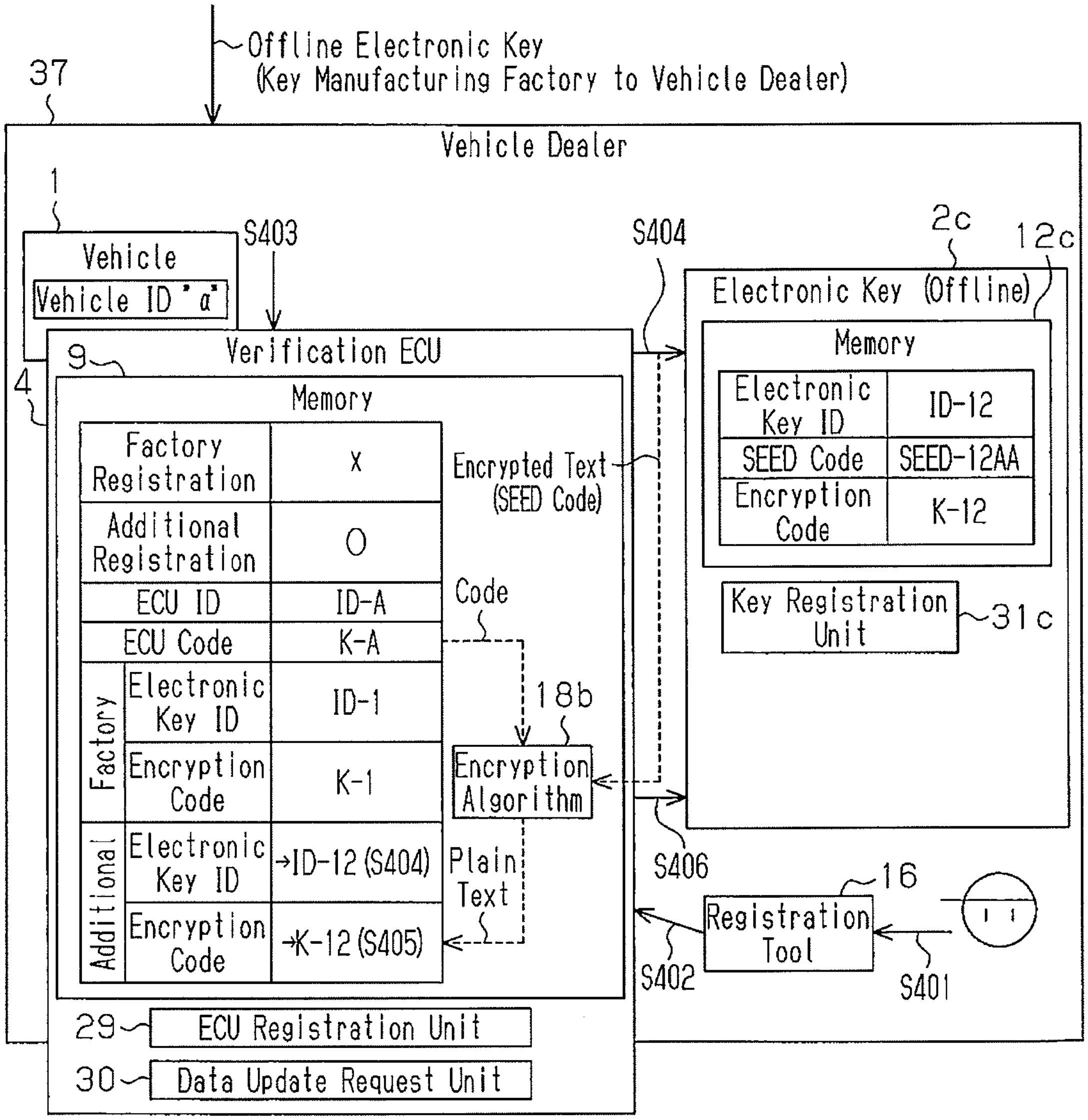
FIG. 7 is a diagram illustrating the registration of the offline-registered electronic key.

Referring to FIGS. 6 and 7, when network communication is not available, an electronic key 2*c* may be additionally registered offline to the vehicle 1 (verification ECU 4) using the registration tool 16, which is provided in, for example, a vehicle dealer 37. In this case, referring to FIG. 6, an electronic key 2*c* for offline registration is manufactured in the key manufacturing factory 38.

In step S301, the operator checks or reads the vehicle ID "α" of the vehicle 1. In step S302, the operator sends an order for the offline-registered electronic key 2*c* to the key manufacturing factory 38. The order includes the vehicle ID "α" and the operator ID "ID-U1". The order does not have to be a paper document and may be placed through a FAX, telephone, mail, or the like.

In step S303, the key manufacturing factory 38 notifies the management center 17 of the vehicle ID "α" and the operator ID "ID-U1" included in the order. The key manufacturing factory 38 may send the notification of the vehicle ID "α" and the operator ID "ID-U1" to the management center 17 through a FAX, telephone, mail, or the like.

In step S304, the registration control unit 33 computes a SEED code that is registered to the electronic key 2*c*. More specifically, based on the vehicle ID "α" acquired from the management center 17, the registration control unit 33 refers to the vehicle database 24 and the ECU database 25 to read the ECU code used for additional registration of the electronic key 2*c*, that is, the ECU code "K-A" associated with the ECU ID "ID-A". Further, the registration control unit 33 generates an encryption code "K-12", which is used to compute the SEED code, and inserts the ECU code "K-A" as an encryption code and an encryption code "K-12" as a plain text in the encryption algorithm 28 to compute a SEED code "SEED-12AA" as an encrypted text dedicated to the ECU ID "ID-A".

In step S305, the registration control unit 33 notifies the key manufacturing factory 38 of the SEED code "SEED-12AA" and the encryption code "K-12". The notification of the SEED code "SEED-12AA" and the encryption code "K-12" may be performed through a FAX, telephone, mail, or the like.

In step S306, the SEED code "SEED-12AA" and the encryption code "K-12", which are acquired from the management center 17, are written to the memory 12*c* of the electronic key 2*c* to manufacture the electronic key 2*c* in the key manufacturing factory 38.

In step S307, the SEED code "SEED-12AA" and the encryption code "K-12", which are written to the electronic key 2*c*, are associated with each other and reflected to the vehicle database 24 and the key database 26 of the management center 17. More specifically, the key manufacturing factory 38 notifies the management center 17 of the electronic key ID "ID-12" that is written to the electronic key 2c. The data update unit 34 writes the electronic key ID "ID-12" and the operator ID "ID-U1", which is acquired from the key manufacturing factory 38 in step S303, in association with each other to the vehicle database 24. This associates the set of the electronic key ID "ID-12" and the operator ID "ID-U1" with the set of the vehicle ID "α" and the ECU ID "ID-A".

Steps S301 to S307 are repeated whenever an offline-registered electronic key 2c is manufactured. Accordingly, the number of sets of the electronic key ID and the encryption code stored in the key database 26 conforms to the number of the manufactured electronic keys 2c. The key manufacturing factory 38 ships the manufactured electronic key 2c to the vehicle dealer 37 that placed the order.

Referring to FIG. 7, the additional registration of the electronic key 2c to the vehicle 1 (verification ECU 4) is performed, for example, in the vehicle dealer 37 in an offline environment. Since network communication is not available in the offline environment, the registration of the electronic key 2c is performed within the limited area of the vehicle dealer 37. The offline registration is performed using, for example, the registration tool 16 that is provided in the vehicle dealer 37.

In step S401, the operator inputs a command to the registration tool 16 to start additional registration. In step S402, the registration tool 16 sends an additional registration command to the verification ECU 4 through wire-connected communication in response to the additional registration start command.

In step S403, the registration tool 16 instructs the ECU registration unit 29 to read the registered electronic key ID. In response, the ECU registration unit 29 checks whether or not the registered electronic key ID (here, electronic key ID "ID-1") is stored in the memory 9. If there is no registered electronic key ID, the additional registration process is forcibly terminated.

In step S404, the ECU registration unit 29 reads the electronic key ID and the SEED code from the electronic key 2c through LF band bidirectional near-field wireless communication. More specifically, the ECU registration unit 29 transmits a key information acquisition request to the electronic key 2c. When the key registration unit 31c receives the key information acquisition request from the verification ECU 4, the key registration unit 31c reads the electronic key ID "ID-12" and the SEED code "SEED-12AA" from the memory 12c and transmits the electronic key ID "ID-12" and the SEED code "SEED-12AA" to the vehicle 1. The ECU registration unit 29 writes the electronic key ID "ID-12", which is acquired from the electronic key 2c, to the additionally registered electronic key ID storage region of the memory 9.

In step S405, the ECU registration unit 29 generates the encryption code "K-12", which is related to the electronic key ID "ID-12", based on the SEED code "SEED-12AA", the ECU code "K-A", and the encryption algorithm 18b. Then, the ECU registration unit 29 writes the encryption code "K-12" to the memory 9. In this case, the ECU registration unit 29 inserts the ECU code "K-A" as an encryption code and the SEED code "SEED-12AA" as an encrypted text in the encryption algorithm 18b to compute the encryption code "K-12" as a plain text. The encryption code "K-12" is written to the additional registration encryption code storage region of the memory 9.

In step S406, the ECU registration unit 29 transmits a SEED code delete request to the electronic key 2c through LF band bidirectional near-field wireless communication. In response to the SEED code delete request, the key registration unit 31c deletes the SEED code "SEED-12AA" from the memory 12c.

Figure 8:
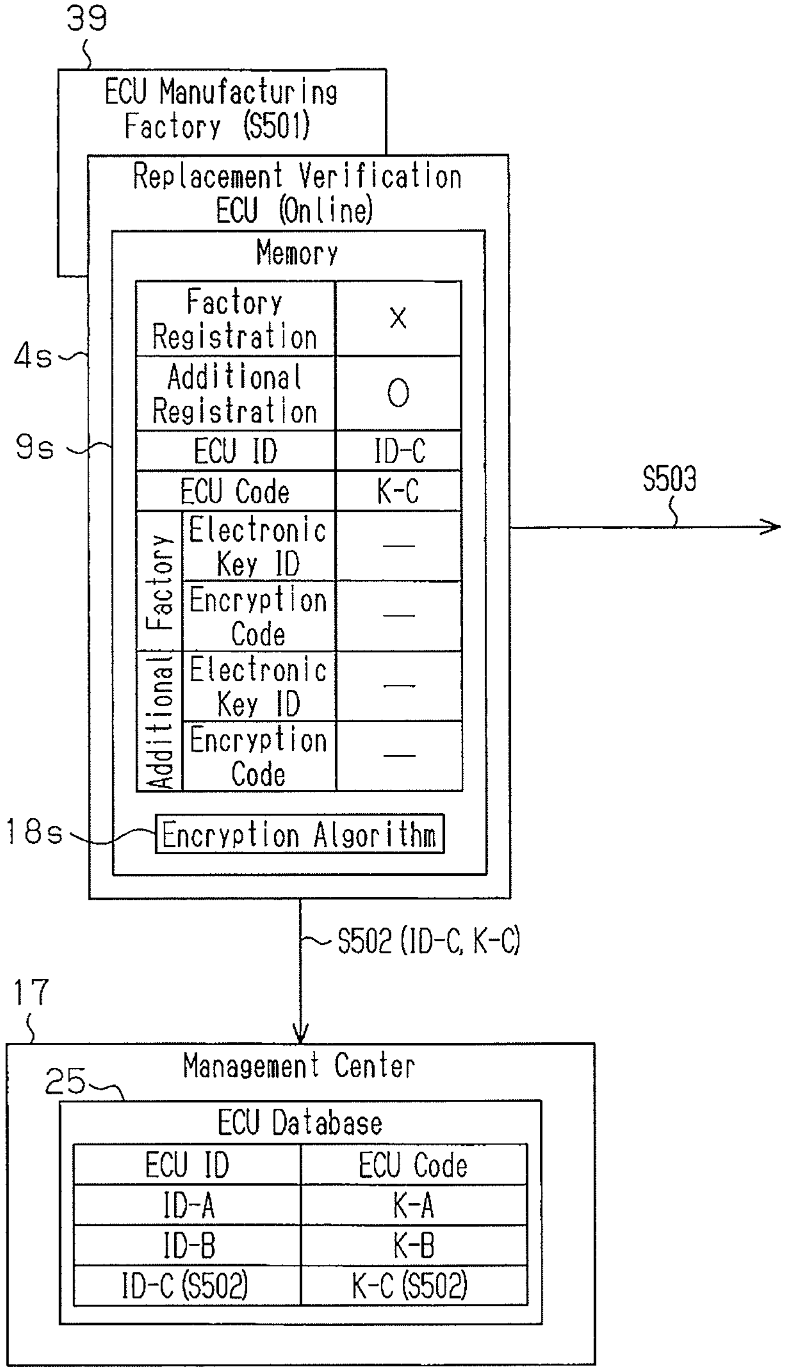
FIG. 8 is a diagram illustrating the manufacturing of a replacement ECU suitable for online reregistration.

(IV) Replacement of Verification ECU (IV-1) Manufacturing of Replacement Verification ECU Suitable for Online Reregistration When, for example, the verification ECU 4 installed in the vehicle 1 malfunctions, the verification ECU 4 needs to be replaced by a new one, and the electronic keys have to be reregistered. Referring to FIG. 8, when reregistering the electronic keys online, a verification ECU 4s suitable for online reregistration is manufactured in an ECU manufacturing factory 39. The verification ECU 4 is one example of a first controller, and the verification ECU 4s is one example of a second controller.

In step S501, the verification ECU 4s is manufactured in the ECU manufacturing factory 39 by writing an ECU ID "ID-C", an ECU code "K-C", and an encryption algorithm 18s to a memory 9s of the verification ECU 4s. In the memory 9s, a factory registration flag that indicates whether or not factory registration is permitted is set to "rejected (marked by cross in FIG. 8)", and an additional registration flag that indicates whether or not additional registration is permitted is set to "acceptable (marked by circle in FIG. 8)". The memory 9s of the verification ECU 4s does not store an encryption code generation logic.

In step S502, the ECU ID "ID-C" and the ECU code "K-C", which are written to the verification ECU 4s, are associated with each other and reflected to the ECU database 25 in the management center 17. The updating of the ECU ID and the ECU code in the key database 25 may be automatically performed by a network system or manually performed by an operator.

In step S503, the manufactured verification ECU 4s is delivered to the vehicle dealer 37. Steps S501 to S503 are repeated whenever the verification ECU 4s is manufactured. The number of the sets of the ECU ID and the ECU code stored in the ECU database 25 conforms to the number of the manufactured verification ECUs 4s.

(IV-2) Online Key Reregistration

Figure 9:
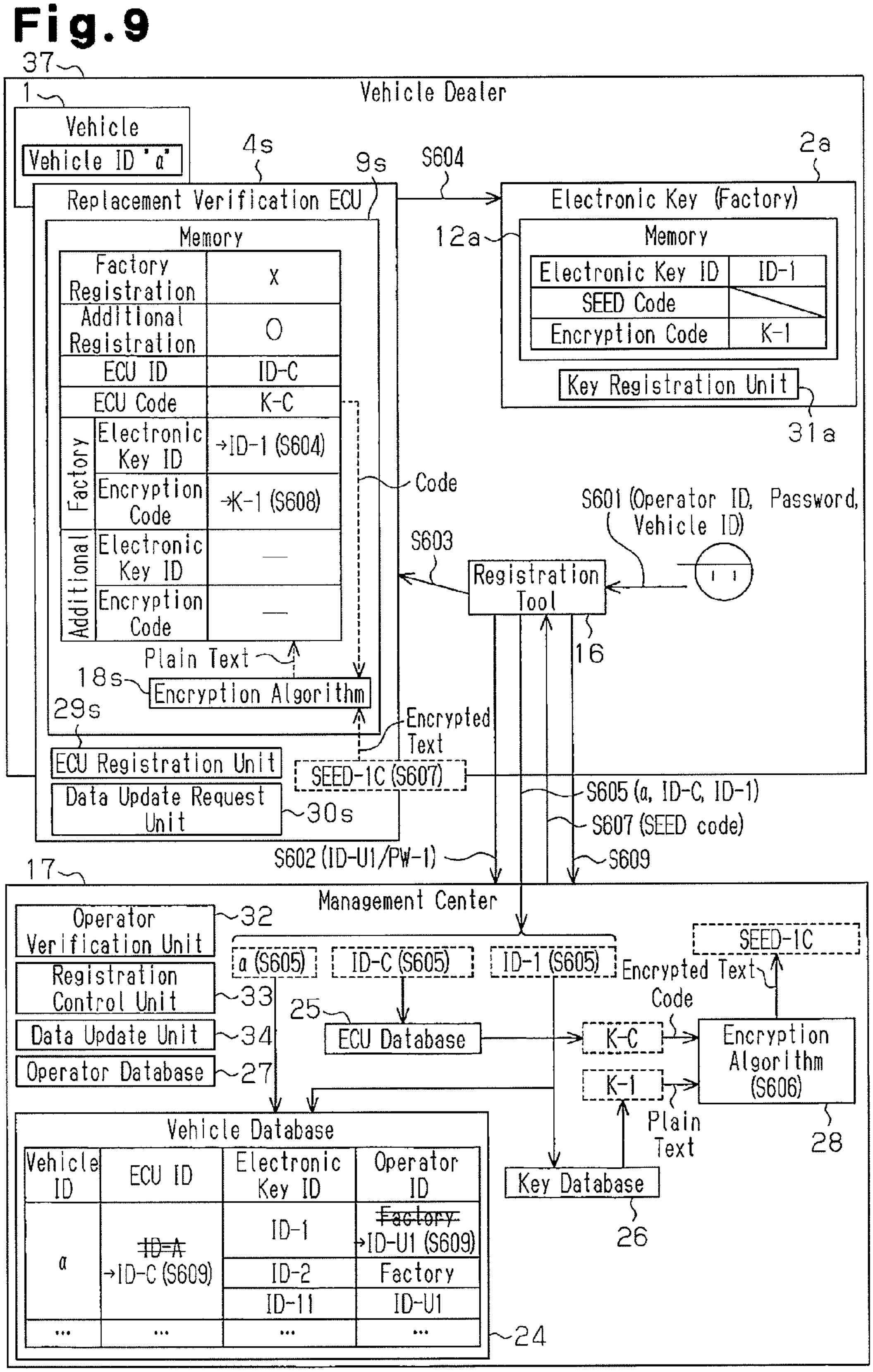
FIG. 9 is a diagram illustrating online reregistration.

Referring to FIG. 9, when network communication is available, electronic keys may be reregistered online to the verification ECU 4s, which has replaced the old verification ECU 4, in the vehicle 1 using the registration tool 16, which is provided in, for example, the vehicle dealer 37. The reregistration of the electronic key 2a will now be described.

In step S601, the operator inputs a command to the registration tool 16 to start key reregistration. In this case, the operator inputs an operator ID "ID-U1", a password "PW-1", and a vehicle ID "α", which is marked on the vehicle body, to the registration tool 16.

In step S602, the registration tool 16 transmits the operator ID "ID-U1", the password "PW-1", and the vehicle ID "α", which are marked to the vehicle body, to the registration tool 16 through network communication. The operator verification unit 32 verifies the operator when the operator ID "ID-U1" and the password "PW-1" acquired from the registration tool 16 are associated with each other in the operator database 27. Then, when the operator verification unit 32 verifies the operator, the operator verification unit 32 transmits an operator verification accomplishment notification to the registration tool 16 through network communication.

In step S603, the registration tool 16 transmits a key reregistration command to the verification ECU 4 through wire-connected communication in response to the operator verification accomplishment notification.

In step S604, the ECU registration unit 29*s* reads the electronic key ID from the electronic key 2*a* through LF band bidirectional near-field wireless communication. More specifically, the ECU registration unit 29*s* transmits a key information acquisition request to the electronic key 2*a*. When the key registration unit 31*a* receives the key information acquisition request from the verification ECU 4*s*, the key registration unit 31*a* reads the electronic key ID "ID-1" from the memory 12*a*. Then, the key registration unit 31*a* sends the electronic key ID "ID-1" to the vehicle 1. The ECU registration unit 29*s* writes the electronic key ID "ID-1" acquired from the electronic key 2*a* to a storage region of the memory 9*s*. In this case, the electronic key ID "ID-1" may be written to any one of a factory registration storage region and an additional registration storage region.

In step S605, the ECU registration unit 29*s* transmits the electronic key ID "ID-1" from the registration tool 16 to the management center 17 through network communication together with the ECU ID "ID-C", which has already been stored in the memory 9*s*, and the vehicle ID "α", which has been input to the registration tool 16 in step S601.

The registration control unit 33 refers to the vehicle database 24 to determine whether or not the electronic key ID "ID-1" is associated with the vehicle ID "α". When the electronic key ID "ID-1" is associated with the vehicle ID "α", the registration control unit 33 checks whether or not the electronic key 2*a* was registered to the old verification ECU (in the present example, verification ECU 4). Once an electronic key is registered, the electronic key ID of the electronic key is stored in the vehicle database 24 in association with the vehicle ID (and ECU ID). Further, the registration control unit 33 refers to the ECU database 25 and reads the ECU code that is to be used for the reregistration of the electronic key 2*a*, that is, the ECU code "K-C", which is associated with the ECU ID "ID-C". The registration control unit 33 also refers to the key database 26 to read the encryption code that is to be used for the reregistration of the electronic key 2*a*, that is, the encryption code "K-1", which is associated with the electronic key ID "ID-1".

In step S606, the registration control unit 33 generates a SEED code "SEED-1C" based on the ECU code "K-C", the encryption code "K-1", and the encryption algorithm 28. In this case, the registration control unit 33 inserts the ECU code "K-C" as an encrypted text and the encryption code "K-1" as a plain text in the encryption algorithm 28 to compute a SEED code "SEED-1C" as an encrypted text dedicated for the ECU ID "ID-C".

In step S607, the registration control unit 33 transmits the SEED code "SEED-1C" to the registration tool 16 through network communication. The SEED code "SEED-1C" is transmitted to the verification ECU 4*s* from the registration tool 16.

In step S608, the ECU registration unit 29*s* generates an encryption code "K-1" related to the electronic key ID "ID-1" based on the ECU code "K-C", which is stored in the memory 9*s*, the SEED code "SEED-1C", and an encryption algorithm 19*s*. Then, the ECU registration unit 29*s* writes the encryption code "K-1" to the memory 9*s*. In this case, the ECU registration unit 29*s* inserts the ECU code "K-C" as an encryption code and the SEED code "SEED-1C" as an encrypted text in the encryption algorithm 18*s* to compute the encrypted code "K-1" as a plain text. The encryption code "K-1" is written to an electronic key ID storage region of the memory 9*s* in association with the electronic key D "ID-1".

In step S609, the ECU registration unit 29*s* transmits a registration completion notification from the registration tool 16 to the management center 17 through a communication network. When the management center 17 receives the registration completion notification, the management center 17 determines that the encryption code "K-1" has been correctly registered to the verification ECU 4*s*.

Further, in step S609, the data update request unit 30*s* transmits a data update request from the registration tool 16 to the management center 17 through the communication network. In response to the data update request, the data update unit 34 updates the vehicle database 24. In this case, the operator ID "ID-U1", which was acquired in step S602, and the ECU ID "ID-C", which was acquired in step S605, are written to the vehicle database 24 in association with the vehicle ID "α" and the electronic key ID "ID-1". Here, the electronic key ID is rewritten from "ID-A" to "ID-C", and the operator ID is rewritten from factory ID to "ID-U1".

Steps S601 to S609 are repeated whenever a previously registered electronic key is reregistered to the vehicle 1 (verification ECU 4*s*) in the vehicle dealer 37. For example, when reregistering the electronic keys 2*b* and 2*c* to the vehicle 1, the electronic keys 2*b* and 2*c* are registered to the verification ECU 4*s* through the same procedures as the electronic key 2*a*.

Figure 10:
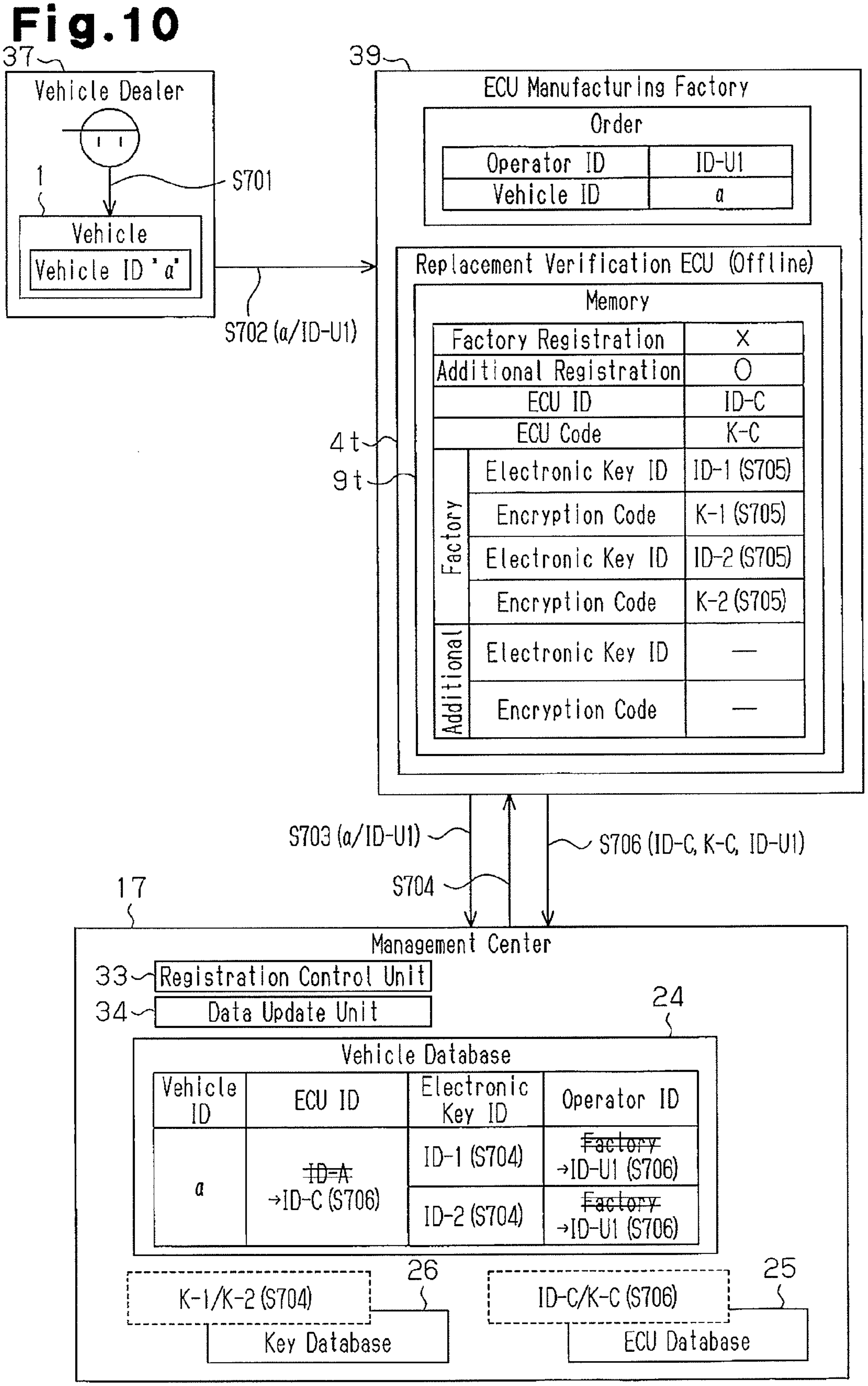
FIG. 10 is a diagram illustrating the manufacturing of a replacement ECU suitable for offline reregistration.

(IV-3) Manufacturing of Replacement Verification ECU Suitable for Offline Reregistration Referring to FIG. 10, when reregistering an electronic key offline, a verification ECU 4*t* suitable for offline reregistration is manufactured in an ECU manufacturing factory 39. The verification ECU 4*t* is one example of a second controller.

In step S701, the operator checks or reads the vehicle ID "α" of the vehicle 1. In step S702, the operator sends an order for the verification ECU 4*t* to the ECU manufacturing factory 39. The order includes the vehicle ID "α" and the operator ID "ID-U1". The order does not have to be a paper document and may be placed through a FAX, telephone, mail, or the like.

In step S703, the ECU manufacturing factory 39 notifies the management center 17 of the vehicle ID "α" and the operator ID "ID-U1" included in the order. The ECU manufacturing factory 39 may send the notification of the vehicle ID "α" and the operator ID "ID-U1" to the management center 17 through a FAX, telephone, mail, or the like.

In step S704, the registration control unit 33 reads the electronic key ID and the encryption code that are used to manufacture the verification ECU 4*t*. Then, the registration control unit 33 notifies the ECU manufacturing factory 39 of the electronic key ID and the encryption code. More specifically, the registration control unit 33 refers to the vehicle database 24 to read the IDs of all of the electronic keys associated with the vehicle ID "α", namely, the electronic key ID "ID-1" and the electronic key ID "ID-2" in the present example. Then, based on the read electronic key IDs, the registration control unit 33 reads the encryption code associated with each electronic key ID. More specifically, the registration control unit 33 refers to the key database 26 and reads the encryption code "K-1" associated with the electronic key ID "ID-1" and the encryption code "K-2" associated with the electronic key ID "ID-2". Then, the registration control unit 33 notifies the ECU manufacturing factory 39 of the electronic key IDs "ID-1" and "ID-2" and the encryption codes "K-1" and "K-2". The notification may be sent through, for example, a FAX, telephone, mail, or the like.

In step S705, the electronic key IDs "ID-1" and "ID-2" and the encryption codes "K-1" and "K-2" that are notified from the management center 17 are written to a storage region of a memory 9*t* in the verification ECU 4*t* to manufacture the verification ECU 4*t*. The electronic key IDs "ID-1" and "ID-2" and the encryption codes "K-1" and "K-2" may be written to any one of a factory registration storage region and an additional registration storage region.

When the manufacturing of the verification ECU 4*t* is completed in the ECU manufacturing factory 39, in step S706, the registration information is notified to the management center 17 and reflected to the vehicle database 24 and the ECU database 25. The registration information includes an ECU ID "ID-C", an ECU code "K-C", and an operator ID "ID-U1". The notification of the registration information may be automatically performed by a network system or manually performed by an operator.

The data update unit 34 updates the vehicle database 24 and the ECU database 25 based on the registration information notified from the ECU manufacturing factory 39. More specifically, the data update unit 34 associates the ECU ID "ID-C" and the operator ID "ID-U1" with the vehicle ID "α" and the electronic key IDs "ID-1" and "ID-2" in the vehicle database 24. This rewrites the ECU ID associated with the vehicle ID "α" from "ID-A" to "ID-C". Further, the operator ID associated with the electronic key ID "ID-2" is rewritten from the factory ID to "ID-2". The data update unit 34 associates the ECU ID "ID-C" and the ECU code "K-C" with each other in the ECU database 25.

(IV-4) Offline Key Reregistration

Figure 11:
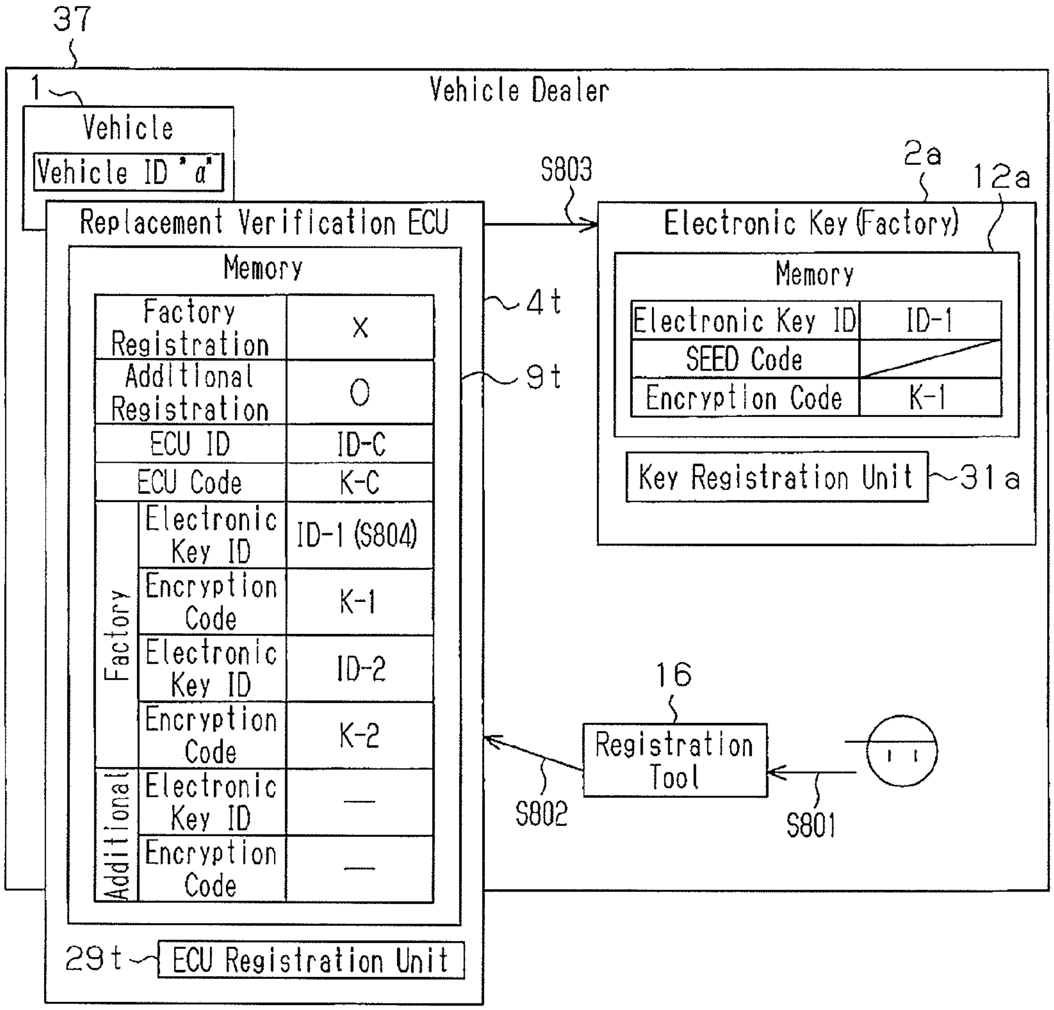
FIG. 11 is a diagram illustrating offline reregistration.

Referring to FIG. 11, even when network communication is not available, the reregistration of an electronic key to the verification ECU 4*t*, which has replaced the old verification ECU 4 in the vehicle 1, may be performed offline using the registration tool 16, which is provided in, for example, the vehicle dealer 37. The reregistration of the electronic key 2*a* will now be described.

In step S801, the operator inputs a command to the registration tool 16 to start key reregistration. In this case, the operator ID does not have to be input.

In step S802, in response to the key reregistration start command, the registration tool 16 sends a key reregistration command to the verification ECU 4*t* through wire-connected communication.

In step S803, in response to the key reregistration command, an ECU registration unit 29*t* reads the electronic key ID from the electronic key 2*a* through LD band bidirectional near-field wireless communication. More specifically, the ECU registration unit 29*t* transmits a key information acquisition request to the electronic key 2*a*. When the key registration unit 31*a* receives the key information acquisition request from the verification ECU 4*t*, the key registration unit 31*a* reads the electronic key ID "ID-1" from the memory 12*a* and transmits the electronic key ID "ID-1" to the vehicle 1.

In step S804, the ECU registration unit 29*t* verifies the electronic key ID "ID-1" acquired from the electronic key 2*a*. More specifically, the ECU registration unit 29*t* determines whether or not the electronic key ID "ID-1" acquired from the electronic key 2*a* conforms to the electronic key ID "ID-1" stored in the memory 9*t*. When the two electronic key IDs conform to each other, the ECU registration unit 29*t* validates the electronic key ID and the encryption code stored in the verification ECU 4*t* and determines and completes the key reregistration. That is, when the two electronic key IDs conform to each other, the ECU registration unit 29*t* determines that the electronic key 2*a* was registered to the old verification ECU, namely, the verification ECU 4 in the present example, and permits reregistration of the electronic key 2*a* to the verification ECU 4*t*. When the electronic keys do not conform to each other, the ECU registration unit 29*t* forcibly ends the key reregistration.

The present embodiment has the advantages described below.

(1) The vehicle ID, which is unique to the vehicle 1, is associated with the electronic key ID, which is unique to the electronic key 2, in the vehicle database 24 of the management center 17. When the electronic key registered to the verification ECU (e.g., electronic key 2*a*) is reregistered to the verification ECUs 4*s* and 4*t*, the electronic key ID of the registered electronic key 2*a* is verified based on the vehicle ID. When the electronic key ID of the registered electronic key 2*a* is verified, the reregistration of the electronic keys 2*a* to the verification ECUs 4*s* and 4*t* is permitted. This ensures security during reregistration.

(2) When reregistering the registered electronic key (e.g., electronic key 2*a*) to the verification ECUs 4*s* and 4*t*, online registration is performed when network communication is available and offline registration is performed when network communication is not available. Thus, the electronic key 2 may be reregistered to the verification ECUs 4*s* and 4*t* under different situations in a manner that is optimal for each situation.

(3) During online reregistration, the management center 17 generates a SEED code and transmits the SEED code to the verification ECU 4*s*. The verification ECU 4*s* inserts the ECU code and the SEED code into the encryption algorithm 18*s* to generate an encryption code. Then, the verification ECU 4*s* stores the encryption code in the memory 9*s*. Thus, during online reregistration, the encryption code is not directly transferred between the verification ECU 4*s* and the management center 17. Rather, the SEED code is transferred. This increases the level of security when the registered electronic key 2*a* is registered online to the verification ECU 4*s*.

(4) During offline reregistration, when the electronic key ID stored in the memory 9*t* conforms to the electronic key ID stored in the registered electronic key 2*a*, the verification ECU 4*t* validates the reregistration of the registered electronic key 2*a*. This increases the level of security when the registered electronic key 2*a* is registered offline to the verification ECU 4*t*.

It should be apparent to those skilled in the art that the present invention may be embodied in many other specific forms without departing from the spirit or scope of the invention. Particularly, it should be understood that the present invention may be embodied in the following forms.

In the key reregistration, the electronic key 2*b* for online registration and the electronic key 2*c* for offline registration may also be reregistered to the verification ECUs 4*s* and 4*t*.

In the above embodiment, the management center 17 includes the databases 24 to 27 for different functions. However, two or more of the databases 24 to 27 may be combined.

The communication performed between the vehicle 1 and the electronic key 2 during key registration or key reregistration is not limited to wireless communication and may be wire-connected communication.

The notification of the electronic key ID to the management center 17 may be performed by, for example, the operator.

The encryption algorithms 18*b*, 18*s*, 18*t*, and 28 may each use a non-AES computation equation.

The memory 9 of the verification ECU 4 does not have to separate the storage regions for the electronic key ID and the encryption code into a factory registration storage region and an additional registration storage region.

The registration tool 16 may be dedicated for key registration.

The registration tool 16 may be a personal computer that downloads, for example, a dedicated application.

The registration tool 16 may be, for example, integrally incorporated in the vehicle 1.

The operator verification may be omitted.

The SEED code does not have to be deleted during offline registration.

The vehicle ID does not have to be marked on the vehicle body and may be, for example, registered to a memory in the vehicle 1 (onboard device).

Operator verification may be performed during factory registration.

Key registration may be performed through at least one of factory registration, online registration, and offline registration.

The area-limited registration (initial registration of electronic key 2) does not have to be performed in the vehicle factory 35 and may be performed within any limited area. Further, online registration and offline registration do not have to be performed in the vehicle dealer 37 and may be performed at a different location.

Network communication does not have to be performed through an Internet communication network and may be performed through a different communication network, such as a telephone network.

The encryption code is not limited to challenge-response verification and may be used for other types of encrypted communication performed between the vehicle 1 (verification ECU 4) and the electronic key 2.

The encryption verification used to verify the electronic key 2 in the electronic key system 3 may be changed.

The communication between the vehicle 1 (verification ECU 4) and the registration tool 16 during key registration is not limited to wire-connected communication and may be wireless communication.

The encryption code computation equation is not limited to the encryption code generation logic 18*a*.

The electronic key system 3 is not limited to an immobilizer system and may be, for example, an operation-free key system, which verifies the electronic key 2 through narrowband communication when communication is established with the vehicle. Further, the electronic key system 3 may be a system other than the operation-free key system, and the communication frequency, communication protocol, and verification method may be changed.

The controller is not limited to the verification ECU 4 and may be changed to a different ECU.

The communication subject is not limited to the vehicle 1 and may be changed to a different apparatus or machine.

The electronic key registration system 15 may be used to delete registrations in addition to performing registrations.

The present examples and embodiments are to be considered as illustrative and not restrictive, and the invention is not to be limited to the details given herein, but may be modified within the scope and equivalence of the appended claims.

The invention claimed is:

1. A method for registering an electronic key to a controller of a communication subject, wherein the electronic key includes a unique electronic key ID and an encryption code corresponding to the electronic key ID and used for encrypted communication between the electronic key and the controller, the method comprising:

locating an electronic key ID of a registered electronic key, which is registered to a first controller that was previously installed in the communication subject, based on a communication subject ID unique to the communication subject;

reregistering the registered electronic key to a second controller, installed in the communication subject in lieu of the first controller, by storing the electronic key ID of the registered electronic key and an encryption code corresponding to the electronic key ID in the second controller; and associating the communication subject ID of the communication subject, a controller ID unique to the first controller, the electronic key ID and the encryption code of the registered electronic key to one another, wherein the reregistering the registered electronic key to the second controller includes checking that the electronic key ID of the registered electronic key is associated with the communication subject ID and the controller ID of the first controller.

2. The method according to claim 1, wherein the reregistering the registered electronic key to the second controller includes at least either one of performing online registration while communicating with a management center when network communication is available and performing offline registration without communicating with the management center.

3. The method according to claim 1, wherein the reregistering the registered electronic key to the second controller includes reregistering the registered electronic key online by communicating with a management center when network communication is available;

the reregistering the registered electronic key online includes reading the electronic key ID from the registered electronic key and writing the electronic key ID to a memory of the second controller, transmitting the communication subject ID of the communication subject, a controller ID unique to the second controller, and the electronic key ID from the second controller to the management center by performing the network communication, reading a controller code associated with the controller ID and the encryption code associated with the electronic key ID from a database of the management center based on the communication subject ID, the controller ID, and the electronic key ID, computing a SEED code by inserting the controller code and the encryption code in an encryption algorithm, transmitting the SEED code from the management center to the second controller by performing the network communication, inserting the SEED code and the controller code, which is stored beforehand in the second controller, in the encryption algorithm to compute the encryption code with the second controller and write the encryption code to the memory, and associating the communication subject ID, the electronic key ID, and the controller ID with one another in the database.

4. The method according to claim 1, wherein the reregistering the registered electronic key to the second controller includes reregistering the registered electronic key offline when network communication is unavailable, the reregistering the registered electronic key offline includes:

manufacturing the second controller, wherein the manufacturing includes locating the electronic key ID of the registered electronic key and the encryption code associated with the electronic key ID based on the communication subject ID, and writing the electronic key ID and the encryption code to a memory of the second controller;

acquiring the electronic key ID from the registered electronic key with the second controller; and validating the electronic key ID and the encryption code that are written to the memory of the second controller when the electronic key ID acquired from the registered electronic key conforms to the electronic key ID written to the memory.

5. The method according to claim 1, further comprising registering one or more electronic keys to the first controller, wherein the registering one or more electronic keys to the first controller includes at least one of performing registration in a limited area, performing registration online by communicating with a management center when network communication is available, and performing registration offline without communicating with the management center.

6. An electronic key registration system, comprising a first controller that can be installed in a communication subject and has a first controller ID;

a second controller that can be installed in the communication subject in lieu of the first controller and has a second controller ID;

an electronic key including a first memory that is configured to store a unique electronic key ID and an encryption code corresponding to the electronic key ID, wherein the encryption code is used for encrypted communication between the electronic key and the first controller or second controller; and a management center capable of communicating with the first controller and second controller, wherein the first controller and second controller each include a second memory and are each configured to register the electronic key by storing the electronic key ID and the encryption code in the second memory, and the management center includes a database and is configured to associate a communication subject ID, which is unique to the communication subject, to the first controller ID or second controller ID corresponding to one of the first and second controllers installed in the communication subject, the electronic key ID and the encryption code in the database, and the management center further includes a registration control unit that is configured to perform operations including:

locating an electronic key ID of a registered electronic key, which is registered to the first controller that was previously installed in the communication subject, based on the communication subject ID, and permitting reregistration of the registered electronic key to the second controller when the second controller is installed in the communication subject in lieu of the first controller if the electronic key ID of the registered electronic key is associated with the communication subject ID and the first controller ID, wherein when the reregistration is permitted, the second controller reregisters the registered electronic key by storing the electronic key and its corresponding encryption code in the second memory of the second controller.

* * * * *